Aug. 4, 1970  F. W. CHRISTENSEN  3,522,858
SNOW DEPTH MEASURING DEVICE

Filed July 12, 1968  2 Sheets-Sheet 1

INVENTOR.
Frank W. Christensen
BY *William R. Wright*
HIS AGENT

Aug. 4, 1970  F. W. CHRISTENSEN  3,522,858
SNOW DEPTH MEASURING DEVICE

Filed July 12, 1968  2 Sheets-Sheet 2

INVENTOR.
Frank W. Christensen
BY
HIS AGENT 3,522,858
SNOW DEPTH MEASURING DEVICE
Frank W. Christensen, Ogden, Utah, assignor to Thiokol Chemical Corporation, Bristol, Pa., a corporation of Delaware
Filed July 12, 1968, Ser. No. 744,352
Int. Cl. G01g 5/04; G01w 1/14
U.S. Cl. 177—208                                4 Claims

ABSTRACT OF THE DISCLOSURE

A snow depth measuring device is provided which permits measurement of small changes in the pressure of a liquid contained in a factory sealed chamber between two parallel plates one of which is exposed to the snow fall.

---

The present invention relates to meteorological and hydrological measurements and, in particular, to a device for measuring the deptht of snow fall in a remote area.

It is important in studies of the weather and in the determination of the effects of water from melting snow that an effective means of determining snow depth at remote sites be provided so that signals from it can be monitored, recorded, and analyzed on a continuous basis. Telemetering electronic equipment of a well developed nature is available to transmit, monitor and record data received at some base station but the detecting means has been a problem in that the device must be capable of easy portability in order that it may be brought to the remote site, should be ready for use upon its arrival there without the need for assembly of parts or filling with fluids and should be extremely durable, responsive and accurate. The devices proposed prior to the present invention have been faulty in many of these respects and largely impractical for general continuous service. The present invention, however, meets all of these requirements and presents a most practical solution to the problem by providing a detecting machine or unit which is fully prepared and sealed at the factory and is ready for immediate installation at the remote site simply by making electrical connections. It is at the same time rugged, durable, light in weight, and very accurate and responsive.

It is, therefore, an object of the present invention to provide an improved snow load measuring detector which is easily portable, factory sealed, rugged, durable, lightweight, responsive and accurate.

Other objects and advantages of the present invention will be apparent from the description and claims which follow:

Figure 1:
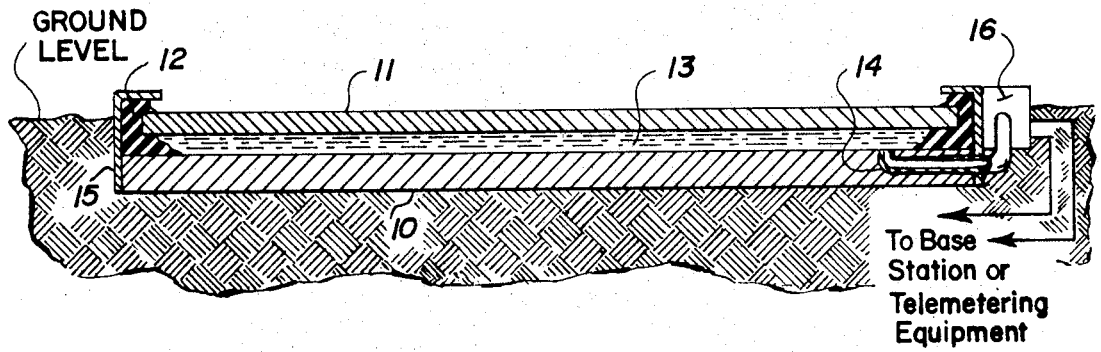
FIG. 1 is a side elevational cross-sectional view of the detector.

As will be seen from the drawings, and in particular FIG. 1, the detector includes a flat, rigid lower base plate 10 and a flat upper plate 11 arranged with their planes parallel to one another but spaced apart from one another in the manner shown with the periphery of upper plate 11 supported in this spaced relationship by means of a continuous seal 12 of resilient material into which the edge of the plate 11 is embedded and which extends to the base plate 10 and adheres to it. This material is preferably a rubber such as room temperature vulcanizing silicone rubber but must be one which when cured will support the upper plate 11 at a fixed distance from the base plate 10 and which will compress slightly under a snow load on plate 11 but will return the plate to its normal position quickly and without taking a permanent set. The seal must also have good sealing and adherence qualities and be compatible with its surrounding materials and environment.

It will be seen from the foregoing that a liquid tight chamber 13 is included between the two plates and is closed by the rubber seal 12. A small outlet conduit 14 is provided. Chamber 13 is filled completely with an incompressible, essentially non-freezing (in the environment) liquid and all trapped air is carefully bled off as the chamber is being filled in order to prevent errors in snow measurement due to its presence. Ordinarily, this liquid is an oil of Society of Automotive Engineers viscosity grade 10 or lighter but it can also be automatic transmission fluid or pure antifreeze, such as ethylene glycol, or a water solution thereof suitable for preventing freezing of the water at the temperature it will encounter in its remote and weather-exposed position.

Figure 2:
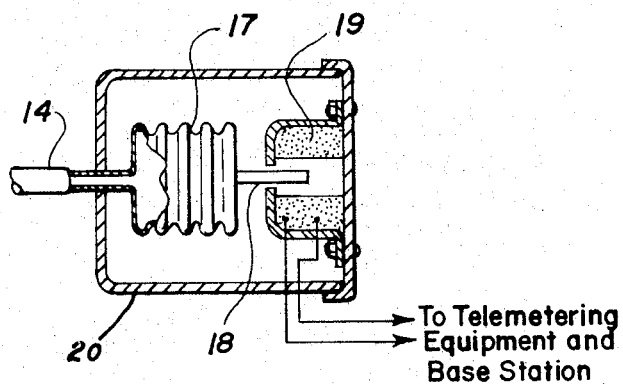
FIG. 2 is a view of the transducer in partial cross-section.

About the outer edge of the base plate 10 is a metal rim or frame 15 which surrounds the whole outer edge and serves to protect it from damage and to help retain the rubber seal. Attached to this frame is a typical pressure transducer 16 (shown in cross-section in FIG. 2) comprising a bellows 17, a core piece 18 and a coil 19 all enclosed in a housing 20. The coil 19 can be made adjustable with respect to the core piece if desired by any suitable means (not shown). A conduit 14 communicably connects the interior of the bellows 17 with chamber 13 and it and the bellows are completely filled with the liquid used therein.

Figure 3:
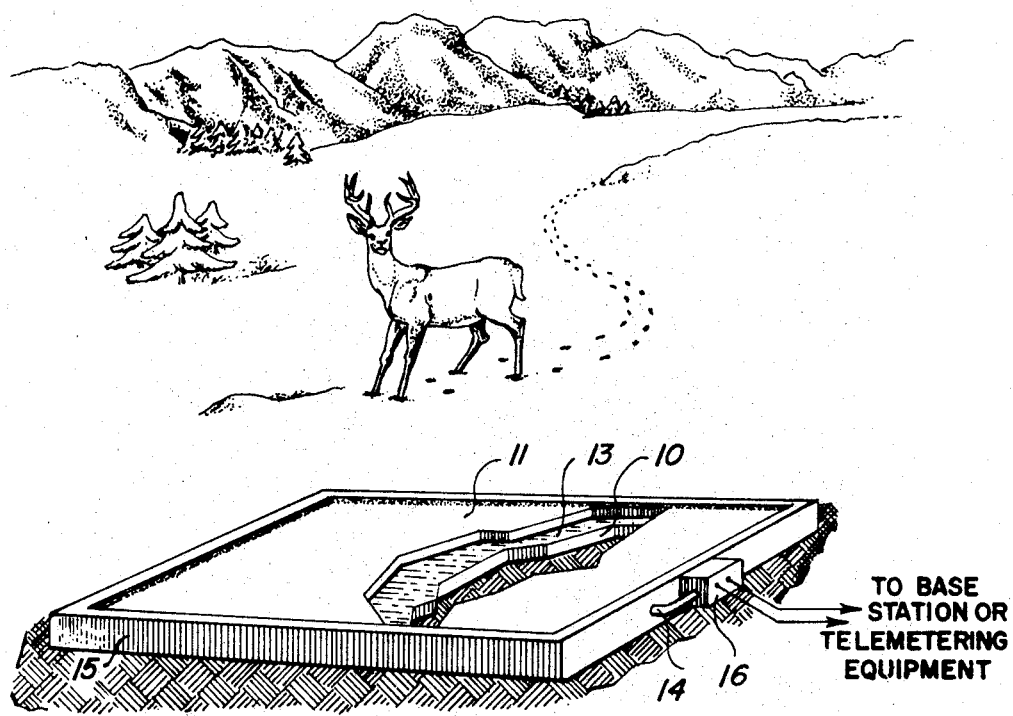
FIG. 3 is a view of the detector installed at a remote site and connected to a base station.

The detector is placed where it will be exposed to the weather with base plate 10 set in the ground and upper plate 11 upward in an exposed position and ordinarily in the plane of the earth's surface as possible. This is shown in FIG. 3. Suitable connections are made to the desired telemetering equipment from the transducer 16.

In operation, as a snowfall occurs snow accumulates on plate 11 and its weight causes a destributed load over it with the result that plate 11 moves downward very slightly as the resilient seal supporting its edges absorbs the load. This movement, although so slight as to be practically immeasurable by ordinary means, causes a small pressure to be created in the liquid in chamber 13, conduit 14, and bellows 17 and the sensitive bellows 17 is distended by it to the right in FIG. 2. This action also moves iron core piece 18 into the central opening of stationary coil 19 and changes the magnetic characteristics of the coil in a well-known manner. This change is carried by suitable wiring to electronic equipment (not shown) which transmits a signal to a base or home station where it is observed and recorded as desired.

The detector is calibrated at the factory after it has been filled and it is not necessary to re-calibrate it in the field.

In a typical specific example of construction of the detector, a four foot square base plate 10 is made of a plastic covered paper honeycomb which is at once light in weight but very stiff rugged and compatible with both the contained liquid and with the external environment to which it will be exposed. Upper plate 11 is made of .025 inch thick aluminum and with Type A automatic transmission fluid as the contained liquid, the distance between the plates 10 and 11 is defined as approximately .175 inch. Other distances between the plates can be used but with these particular materials in these sizes this is the optimum if the thermal coefficents of expansion are considered as they should be if good accuracy of readings is to be obtained. Material sizes and distances other than indicated above may be used provided the calibration of the detector at the factory takes the various factors affecting accuracy into account and that the other factors of compatibility, weight, etc. are also considered.

With the lightweight construction shown, the detector can be easliy carried up a mountain, for instance, or flown in by aircraft. It is, however, rugged enough in its factory-sealed condition, to be handled by ordinary means without any need for special handling. In addition, damage from animals running over it or gnawing upon its rim is not likely to produce a leak or prevent the detector from functioning, nor would its function be seriously interfered with if plate 11 were to be dented with small dents or scratched by the hooves of deer or elk or the feet of smaller animals.

It is to be understood that the form of the invention herewith shown and described is to be taken as a preferred example of the same and that various changes in the shape, size and arrangement of parts may be resorted to without departure from the spirit of the invention or the scope of the subjoined claims.

What is claimed is:

1. A snow load measurement detector comprising the combination of a base plate, an upper plate mounted upon the base in parallel planar disposition thereto and spaced from it, semi-resilient sealing means between the periphery of the upper plate and the base closing a chamber defined by the base plate, upper plate and sealing means, a substantially incompressible non-freezing liquid completely filling said chamber with the liquid having substantially the same coefficient of thermal expansion as the upper plate material, a means for detecting liquid pressure changes and conduit means communicably connecting the chamber with the pressure change detecting means, whereby a snow load upon the upper plate is measured by the extent of the pressure developed in the liquid.

2. The invention set forth in claim 1 with the upper plate being aluminum and the liquid being Type A automatic transmission fluid.

3. The invention set forth in claim 2 with the base plate being constructed of plastic covered paper honeycomb and the distance between the upper plate and base plate being approximately .175 inch.

4. The invention set forth in claim 1 with the sealing means comprising a room temperature vulcanizing silicone rubber.

References Cited

UNITED STATES PATENTS

| | | | |
|---|---|---|---|
| 1,524,928 | 2/1925 | Hardel et al. | 177—208 XR |
| 417,357 | 12/1889 | Fergusson | 73—171 |
| 2,981,101 | 4/1961 | Buck | 177—208 XR |
| 3,372,586 | 3/1968 | Chadwick | 73—171 |
| 3,456,505 | 7/1969 | Schindelholz | 73—170 |

FOREIGN PATENTS 659,440   5/1938   Germany.

OTHER REFERENCES

R. T. Beaumont, "Mt. Hood Pressure Pillow Snow Gage," Journal of Applied Meteorology, vol. 4, October 1965, pp. 626–631.

OTHER REFERENCES

ROBERT S. WARD, JR., Primary Examiner

U.S. Cl. X.R.

73—170